Sept. 30, 1941.  G. W. BINNS ET AL  2,257,452
METAL FINISHING
Filed April 10, 1939  8 Sheets-Sheet 5
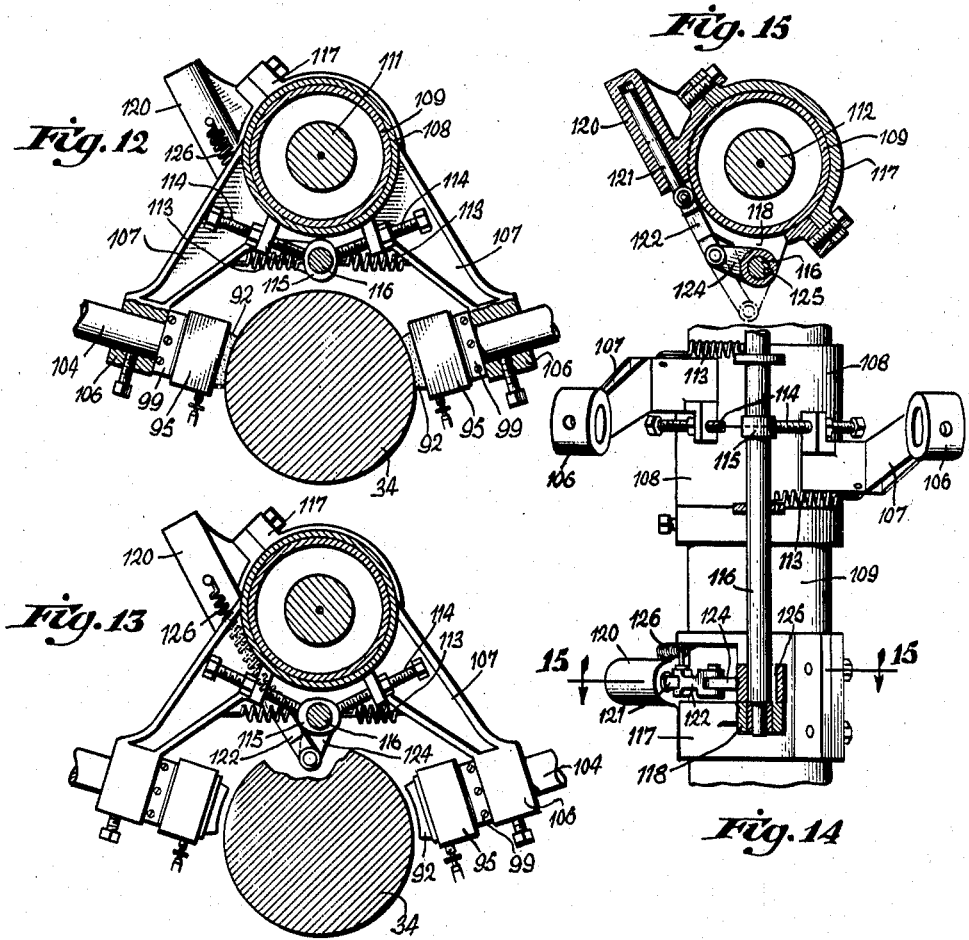
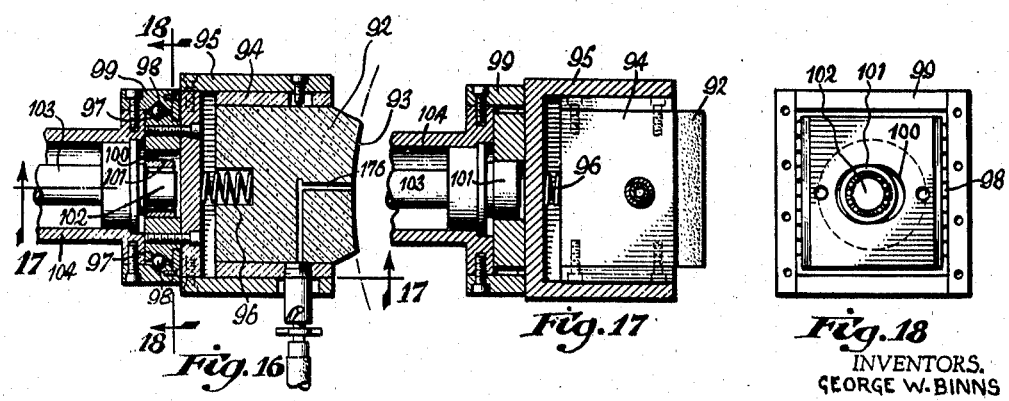
INVENTORS.
GEORGE W. BINNS
ALBERT H. DALL
BY
*A. H. Parsons*
ATTORNEY.

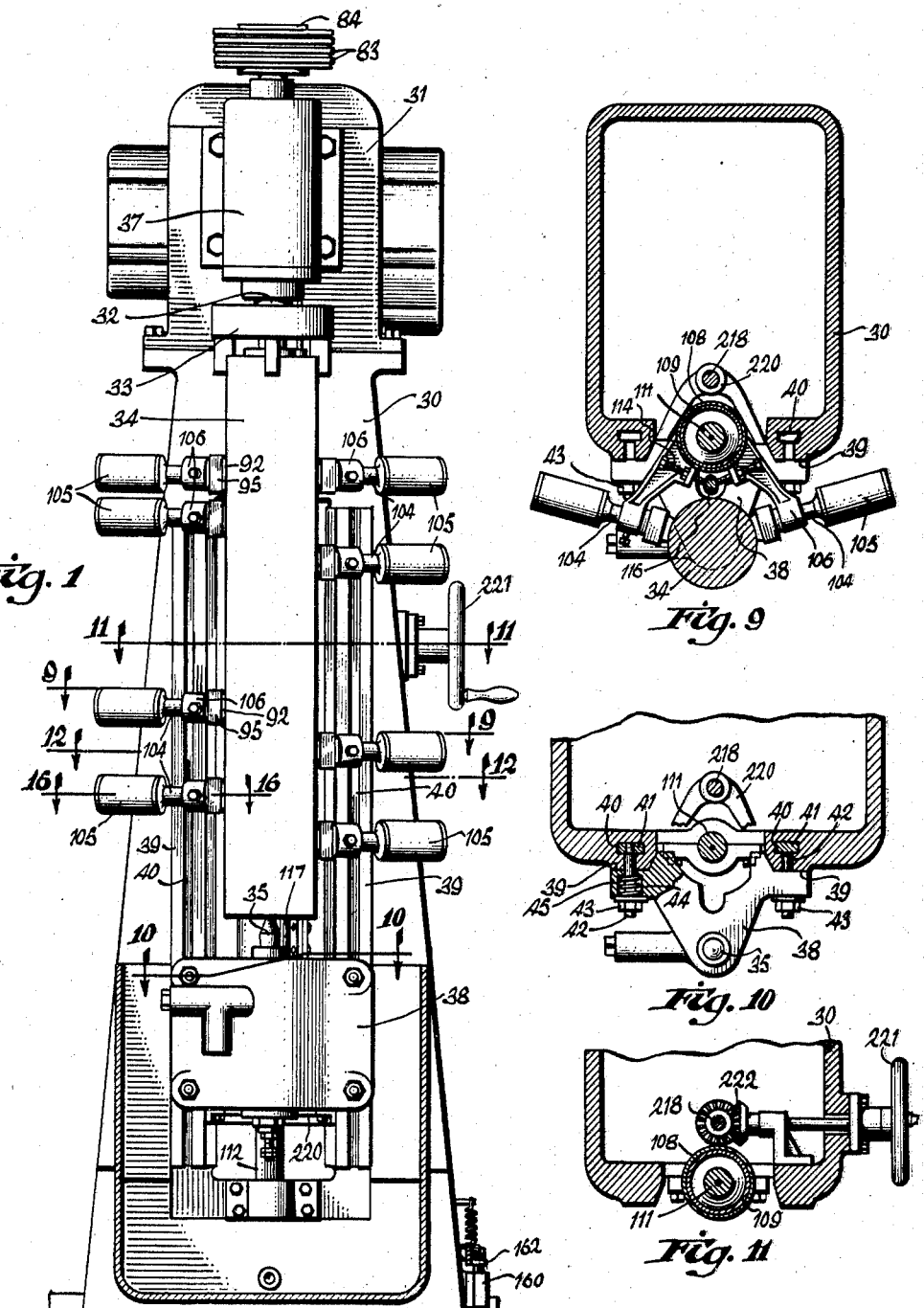

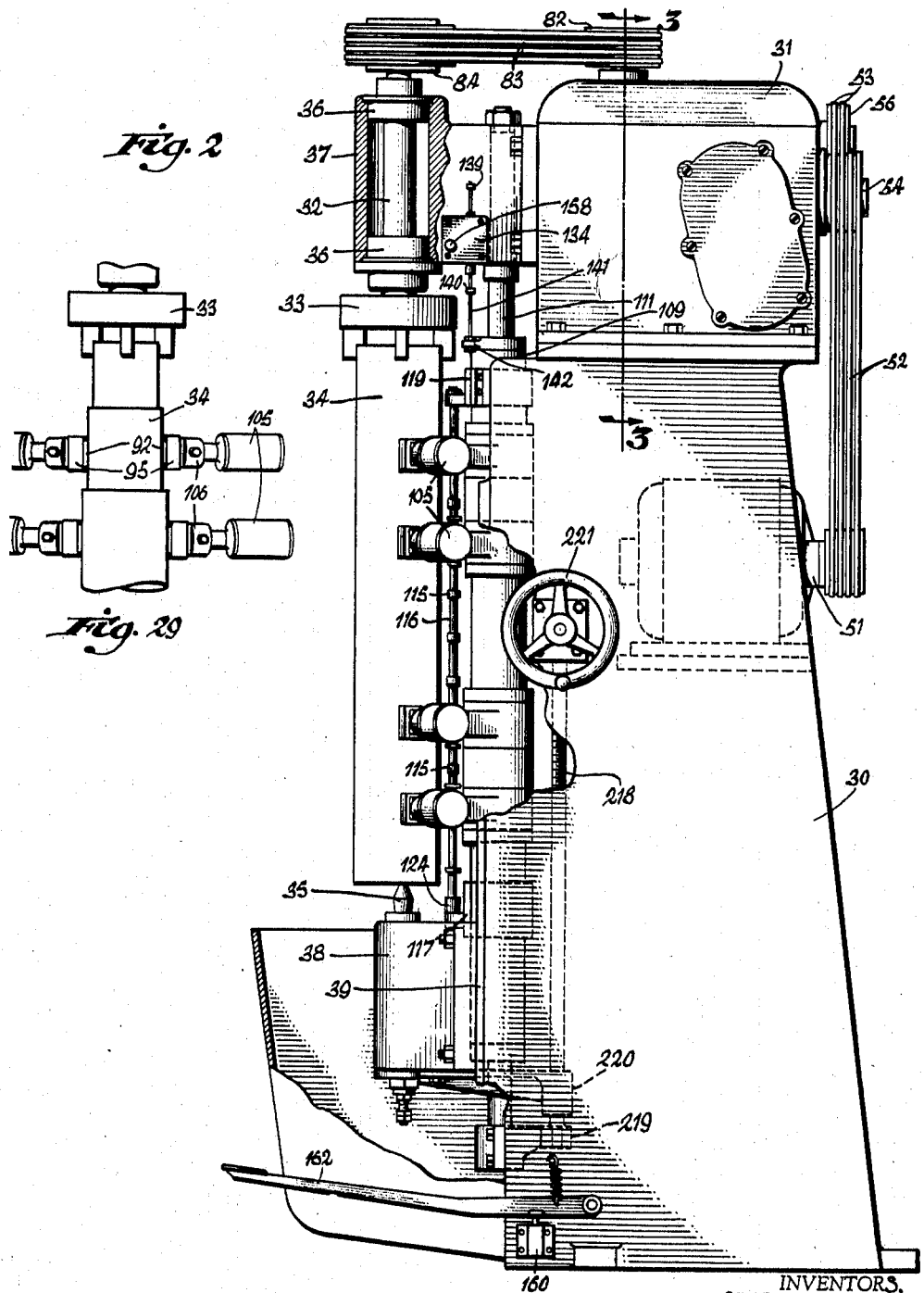

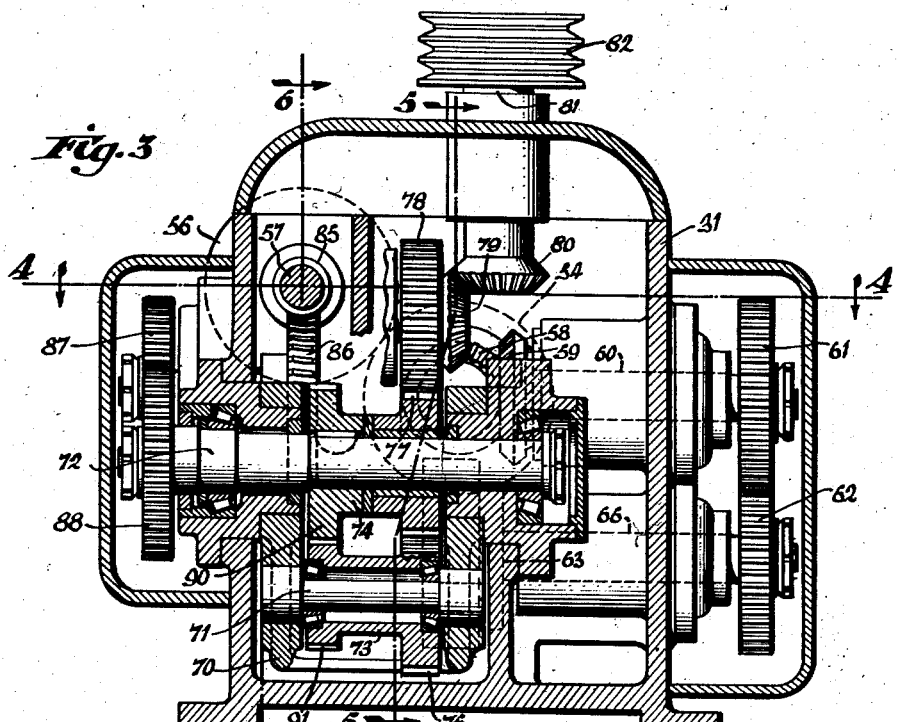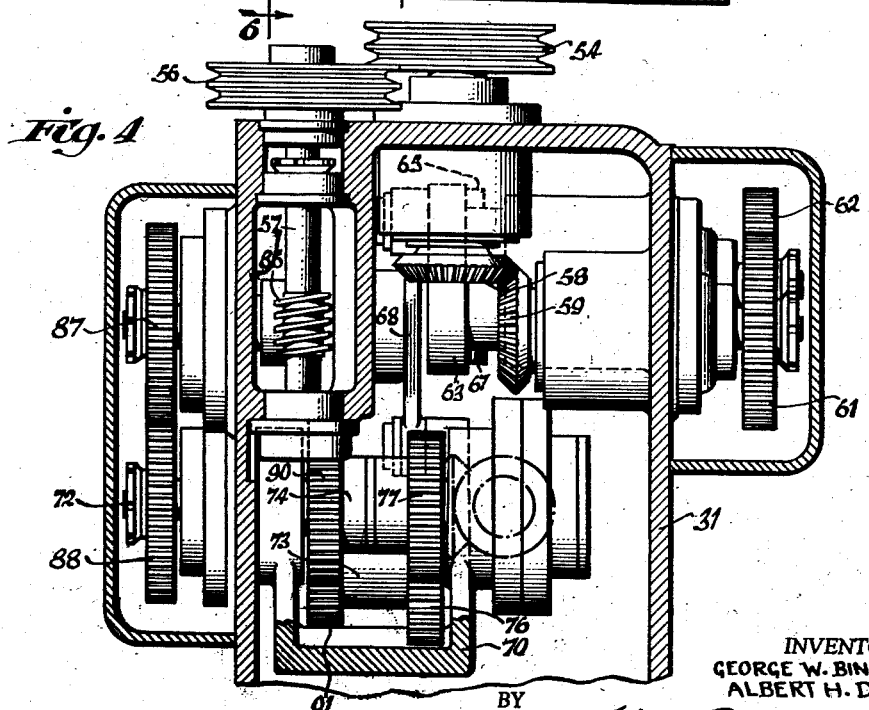

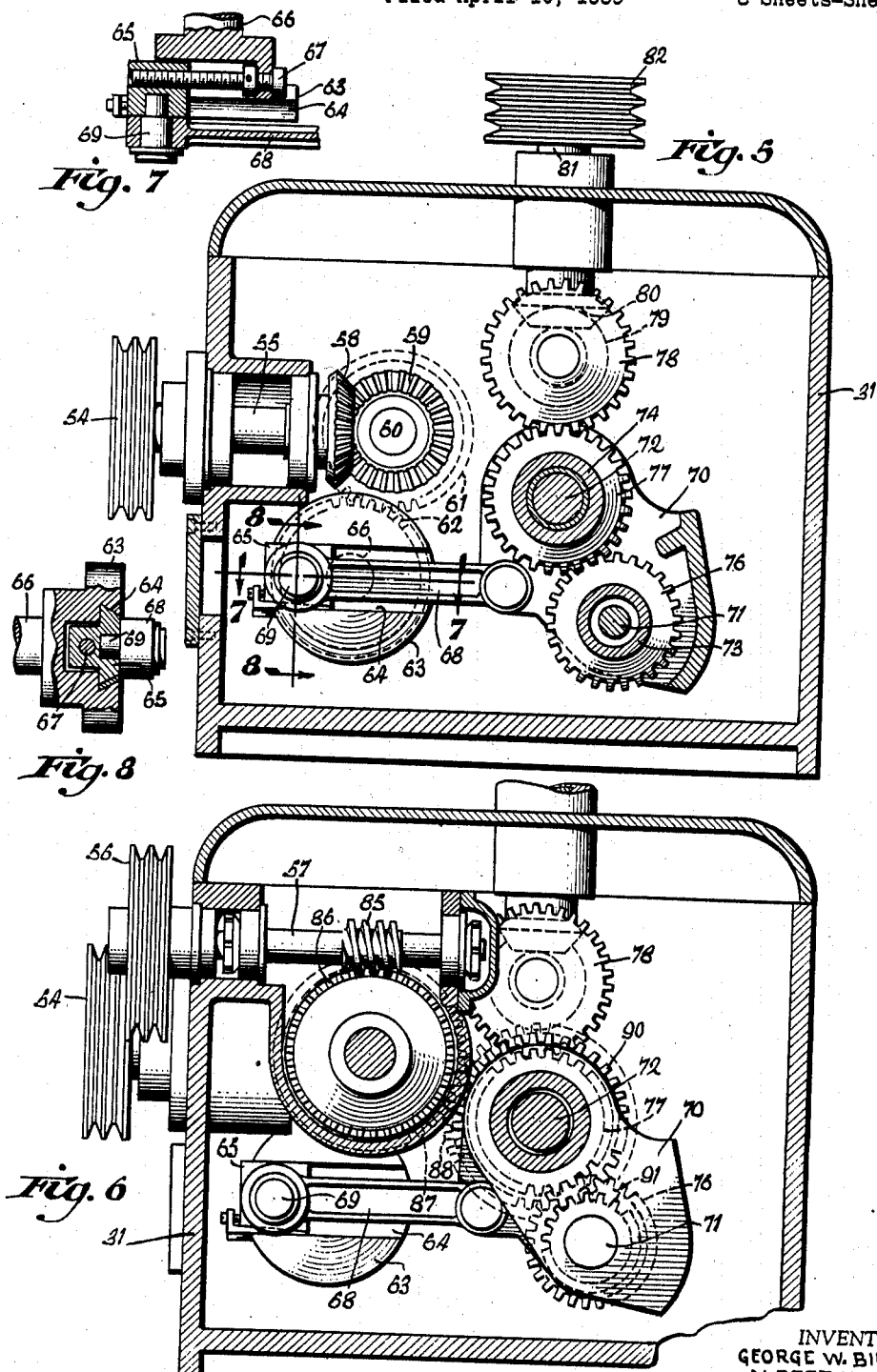

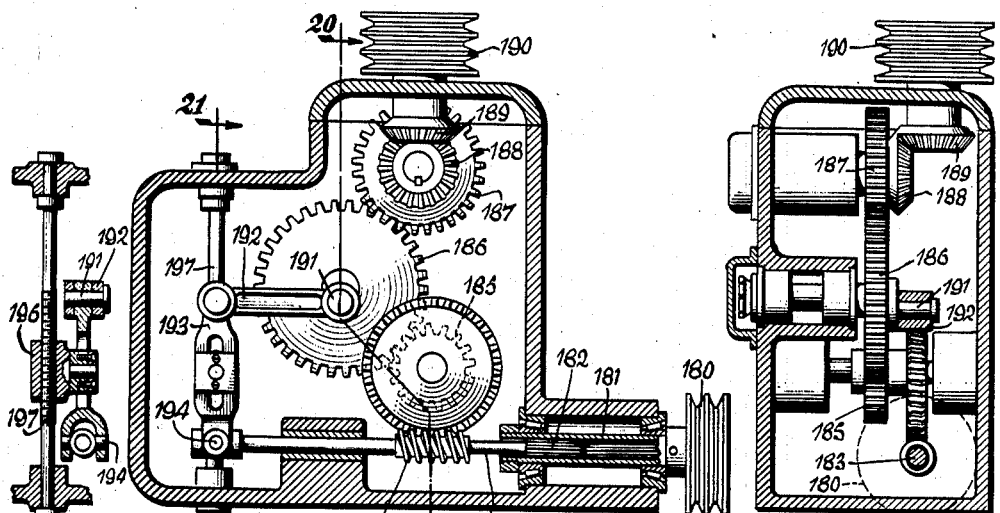
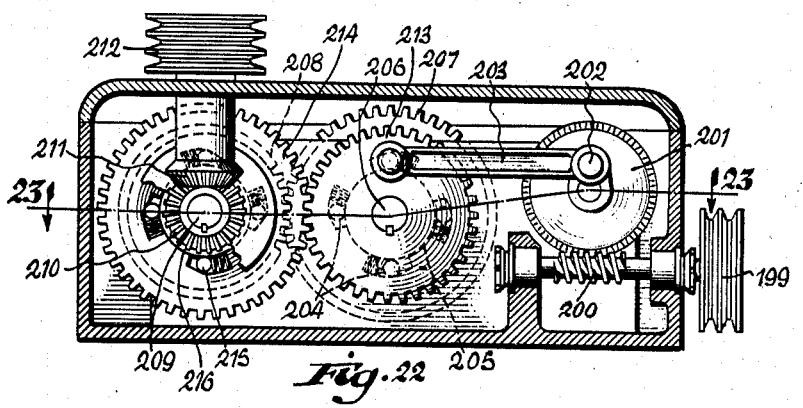
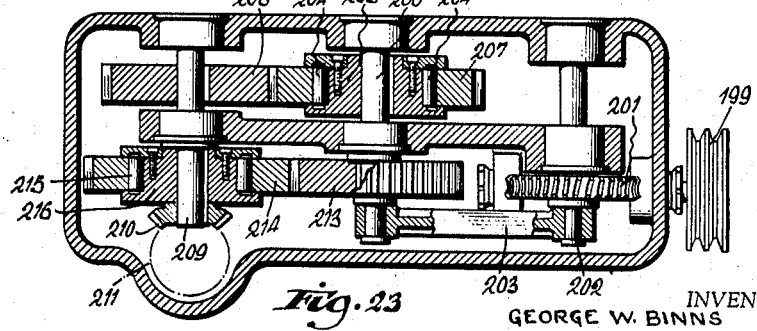

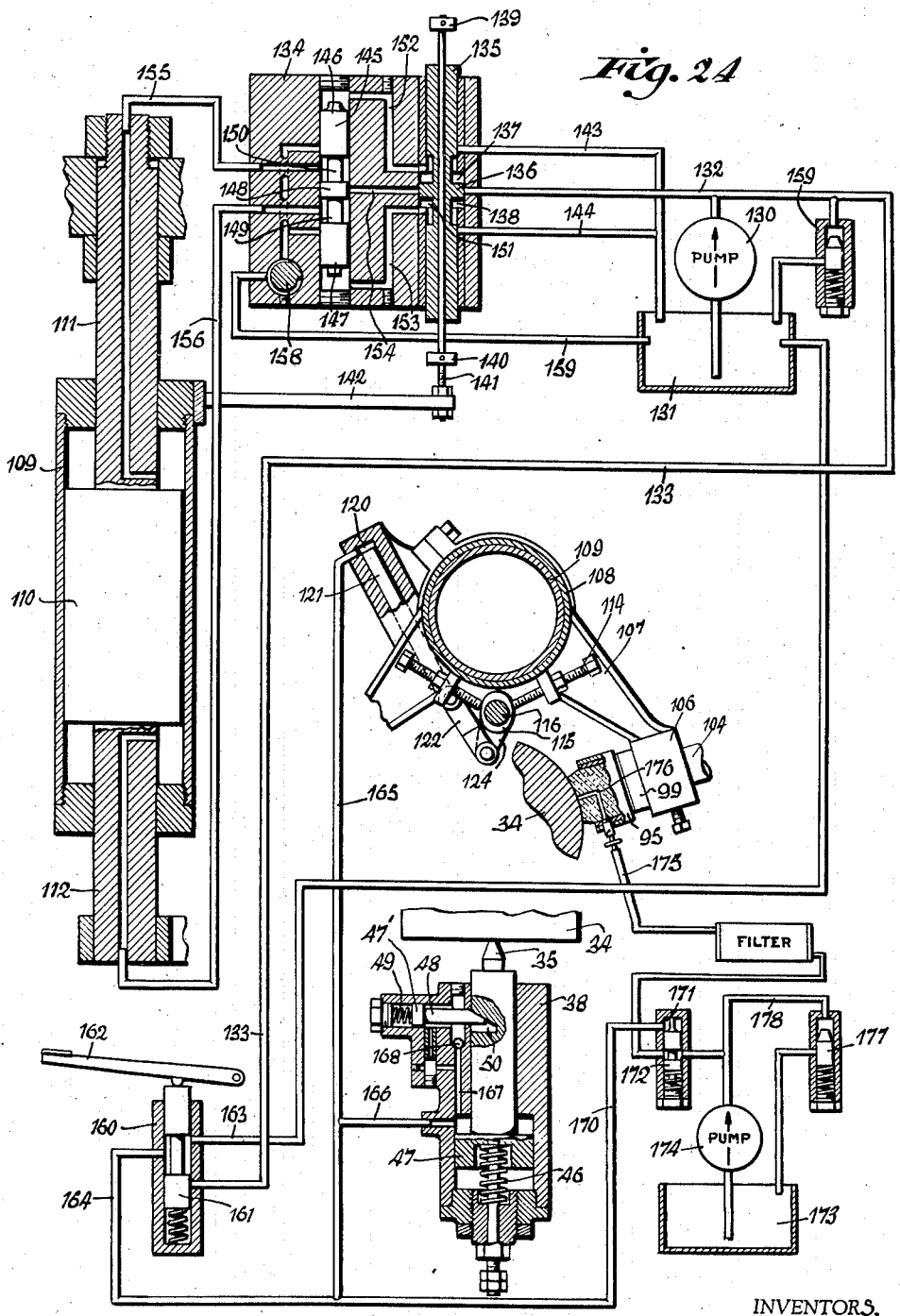

Sept. 30, 1941. G. W. BINNS ET AL 2,257,452
METAL FINISHING
Filed April 10, 1939 8 Sheets-Sheet 8
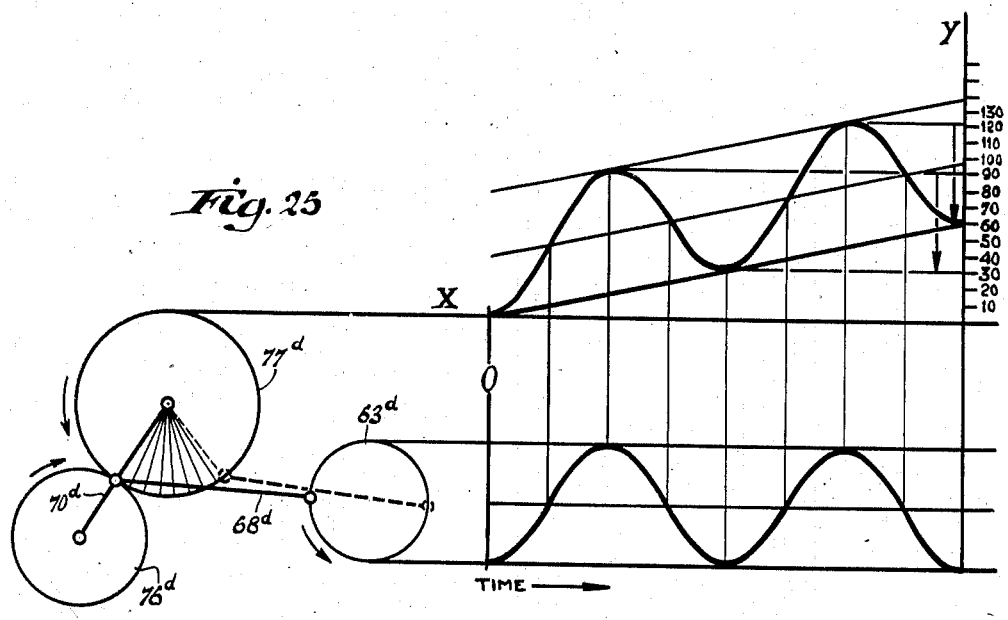
Fig. 25
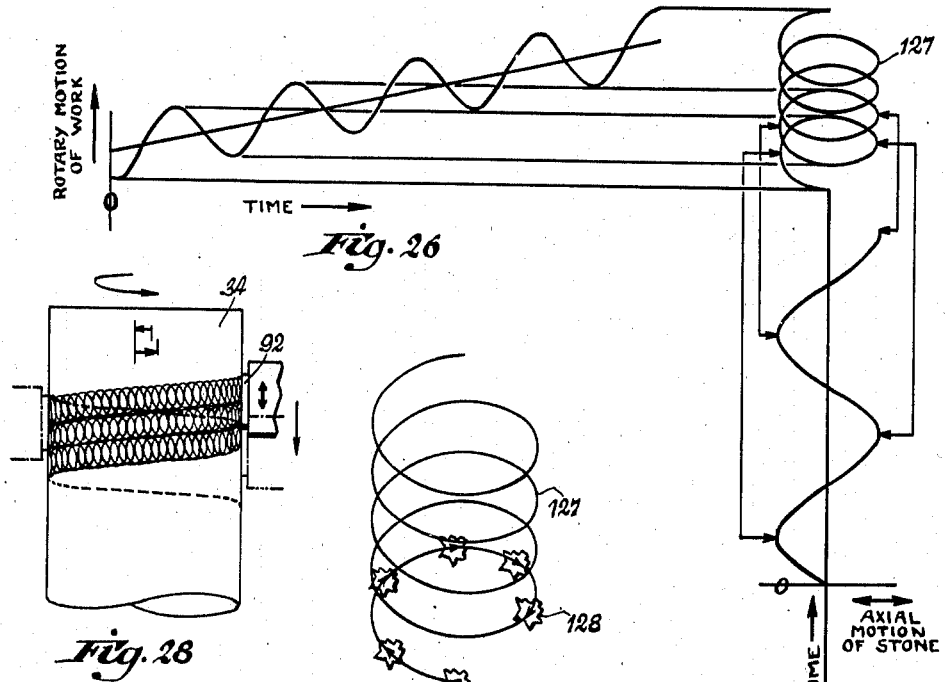
Fig. 26
Fig. 28
Fig. 27
INVENTORS.
GEORGE W. BINNS
ALBERT H. DALL
BY
ATTORNEY.

Patented Sept. 30, 1941

2,257,452

UNITED STATES PATENT OFFICE 2,257,452

METAL FINISHING

George W. Binns, Cincinnati, and Albert H. Dall, Silverton, Ohio, assignors to Cincinnati Grinders Incorporated, Cincinnati, Ohio, a corporation of Ohio Application April 10, 1939, Serial No. 267,140

14 Claims. (Cl. 51—67)

This invention relates to improvements in the art of metal finishing and has particular reference to an improved process for the production of a character of surface on metallic articles designed to be subjected to subsequent frictional use—which surface shall have a geometrical characteristic, tending to reduce to a minimum subsequent wear of the surface itself or any surface meeting therewith under subsequent conditions of use.

One of the principal objects of the present invention is the provision of an improved process of production of a surface on a metallic article by the employment of a solid abrasive which shall effect improved multi-directional relative movement of the work and abrasive in a manner successively to utilize the various sides or facets of the individual abrasive particles while effecting a self-cleaning or chip-freeing action as respects said particles, thus better insuring a free cutting rather than tearing action of the individual abrasive particles as respects the metal removal from the surface being operated upon.

A further object of the invention is the provision of improved apparati capable of utilization for carrying out the improved process and producing the desired surface upon successive work pieces in a rapid and efficient manner.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Figure 1 is a front elevation of a machine capable of producing the desired finish on a shaft or like cylindrical work piece.

Figure 2 is a side elevation thereof,

Figure 3 is a fragmentary vertical sectional view taken as on the line 3—3 of Figure 2.

Figure 4 is a section on the line 4—4 of Figure 3, illustrating additional features of the work driving mechanism.

Figure 5 is a section as on the line 5—5 of Figure 3.

Figure 6 is a section in a different plane as on the line 6—6 of Figure 3.

Figure 7 is a detail view of the eccentric throw adjustment as on line 7—7 of Figure 5, and Figure 8 is a section therethrough at right angles thereto as on the line 8—8 of Figure 5.

Figure 9 is a transverse sectional view particularly illustrating the engagement of the abrading members with the work taken as on the line 9—9 of Figure 1.

Figure 10 is a sectional view through the footstock guiding and retaining mechanism as on the line 10—10 of Figure 1.

Figure 11 is a fragmentary sectional view as on the line 11—11 of Figure 1, illustrating the manual positioning mechanism for the footstock.

Figure 12 is a transverse sectional view on the line 12—12 of Figure 1 illustrating the general position of the stone holder elements when in engagement with the work.

Figure 13 is a similar view illustrating the stone holders in disengaging position.

Figure 14 is an enlarged fragmentary elevation of the ram cylinder showing the mounting of the cam shaft control and stone holder elements thereon.

Figure 15 is a sectional view as on the line 15—15 of Figure 14.

Figure 16 is a sectional view through one of the stone holder units as on the line 16—16 of Figure 1.

Figure 17 is a sectional view at right angles as on the line 17—17 of Figure 16.

Figure 18 is a view partially in elevation and partially in section as on the line 18—18 of Figure 16.

Figure 19 is a view of an alternative form of work driving mechanism.

Figure 20 is a semi-sectional view thereof as on the general line 20—20 of Figure 19.

Figure 21 is a sectional view of the throw adjusting mechanism taken as on line 21—21 of Figure 19.

Figure 22 is a plan view of a further alternatively employable form of work driving mechanism, the supporting casing being shown in section.

Figure 23 is a section therethrough on the line 23—23 of Figure 22.

Figure 24 is a diagrammatic view of the lubrication and hydraulic control circuits.

Figure 25 is a diagrammatic view illustrating the nature of a movement imparted to the rotary work piece by the combined effect of the direct rotary and superimposed rotary oscillatory movements impartable thereto by the illustrated drive mechanisms.

Figure 26 is a diagram illustrating the relative movement between an individual abrasive particle on the abrading member and the work surface resulting from the combined effects of work movement as illustrated in Figure 25, combined with the individual high frequency oscillations or reciprocations of the abrasive element.

Figure 27 is a magnified view of this relative path of movement illustrating the successive directional activities of different portions of the periphery of an individual abrasive grain or element.

Figure 28 is a view diagrammatically illustrating the actual path of said element with respect to a work piece when the combined high speed relative axial oscillation and axial progression are effected between work and abrading element in addition to the rotary and superimposed rotary oscillatory movements, and Figure 29 illustrates the adjustment of the abrasive elements for simultaneous operation upon various portions of a multi-diameter work piece.

In the production of any machine tool element, shaft, bearing or the like in which two parts or surfaces must have movement relative to each other, either of relative reciprocation or rotation, it has long been recognized that for maximum conformity of the mating or interfitting surfaces to a true geometric plane without elevations, depressions or roughness of any character is highly desirable as tending both to eliminate friction and wear of the parts and insure their free and satisfactory operation. This is particularly desirable in the case of parts of circular form in cross section since while wear between flat surfaces can frequently be readily compensated, it is difficult and frequently from a commercial viewpoint impossible to compensate for the sloppiness occasioned by wear or otherwise by replacement of one or another of the elements with a new "oversize" piece. Demands are therefore made to produce such elements to the highest degree of accuracy, which in the case of steel or other hardened material is normally effected by grinding.

It has been appreciated, however, that the relative rotation of the work surface and grinding wheel surface during the grinding operation tends to produce on the work, even in the finest stages, substantially circumferentially extending minute grooves so that in enlarged profile, the surface of the work presents what is known as a sawtooth appearance.

Various attempts have been made to eliminate this structure and produce on the work an ultimate substantially geometrically flat surface with minimum grooves or scratches, and no rough high points which will tend either to wear the mating part or itself become worn down, decreasing the original tightness or fit of the parts.

While this has been found capable of accomplishment to a large degree with flat or relatively flat surface areas it has not hitherto been capable of accomplishment with cylindrical surfaces, either convex or concave, due to the apparent limitations imparted by the character of the work and the necessity for relative rotation or circumferential movement of work and abrading member in a unidirectional manner and at such speeds that proper abrading can be effected. In such unidirectional movements but a single side or cutting edge of the abrasive particles can be advantageously utilized and these in their forward progressing movement may, and frequently do, create what is known, particularly in connection with other forms of machining, as a built-up edge. This phenomenon, as it well known, causes a tearing off of particles from the surface being machined, producing roughened grooves or scratches extending below the general plane of the surface attempting to be produced.

The present invention contemplates the elimination of the irregularities thus produced by utilization of a process of abrasion by which a continually changing relative path of movement is effected between work surface and individual abrasive particle, such that the various sides of the abrasive are employed in quick and continuously changing succession for effecting the cutting action, the length and direction of stroke being so produced that the cutting edge will automatically remove and at the same time clear itself from the removed chip before the deleterious built-up edge condition is created so that the final surface produced will be a substantially plane or flat cut but untorn.

Certain mechanisms for carrying out of the aforesaid process of metal finishing have been illustrated in the accompanying drawings, and will be described in detail for a clear understanding of the manner of carrying out of the invention, although it is to be understood that alternative structures not here illustrated may with equal facility be employed for carrying out the fundamental broad principles of the invention.

The machine illustrated in Figures 1 and 2, for example, has been illustrated as of the vertical type for convenience, although it will be understood that the principles and mechanical features shown can be employed with the work disposed in either inclined or horizontal position. As shown, it comprises the bed or column 30 having at its upper end the casing 31 containing the drive mechanism for the heatstock spindle 32 terminating in a suitable chuck or like driving member 33 for the work piece 34. At its lower end the work piece is supported on what may be termed a tailstock center 35 for free oscillatory and rotary movements. The headstock spindle 32 is suitably journaled in bearings 36 supported as by bracket 37 from the casing 31.

The tailstock center 35 is, in turn, carried by the adjustable tailstock unit 38 vertically adjustable on ways 39 of the column 30. T-slots 40 formed in the face of the column receive slides 41 carrying clamp bolts 42 which project forwardly through the tailstock and bear clamp nuts 43 for locking the tailstock as an entirety in desired vertically adjusted position. Springs 44 contained in sockets 45 of the lateral flanges on the unit 38 serve to steady the same in position and facilitate its adjustment when the nuts 43 are loosened.

To facilitate introduction and removal of work pieces, the center 35—as shown in detail in connection with Figure 24—is urged in the direction of the work by a spring 46 retractable by a hydraulically actuable piston 47 and normally held in position as by a locking pin 48 urged by spring 49 into engagement with the inclined wall of the wedge-shaped locking recess 50.

One form of work drive mechanism for effecting the desired superimposed movements of rotation and rotary oscillation of the work is indicated in Figures 3 to 8 inclusive.

Drive motor 51 through sets 52 and 53 of multiple belts serves unidirectionally to rotate respectively pulleys 54 on shaft 55, and 56 on shaft 57—both of said shafts being carried by and extending into the casing 31 of the headstock drive unit. Shaft 55 is provided with bevel gear 58, which in turn drives gear 59 on shaft 60. Through change gears 61 and 62 the motion thus effected is transmitted at the rate dependent upon the ratio of these change gears to disc 63, having a transverse groove 64 for eccentric block 65 adjustably positionable in varied eccentric relation to shaft 66 which drives disc 63 as by the adjusting screw 67.

A link 68 oscillatable on crank or eccentric pin 69 carried by block 65 serves to transmit oscillatory movement to the swinging gear bracket 70. The swinging gear bracket 70 carries shafts 71 and 72 on which are mounted the gear couplets 73 and 74. As shown in Figure 5, gear 76 of couplet 73 is in driving mesh with gear 77 of couplet 74, which latter in turn meshes with spur gear 78 having integral therewith a bevel gear portion 79 in driving engagement with bevel pinion 80 on shaft 81. Shaft 81 carries multiple groove pulley 82 coupled by a series of V-belts 83 with the pulley 84 on the headstock spindle 32.

For effecting rotation of the gear couplets and parts just described, shaft 57 is provided with a worm 85 meshing with worm gear 86, which through change gears 87 and 88 drives shaft 72 at selective variable speeds. Shaft 72 has keyed thereon gear 90 of couplet 74 in mesh with gear 91 of couplet 73 for driving the latter, so that rotative movement of pulley 82 and thus of the headstock spindle is effected through the series of drive connections, starting with pulley 56.

By reference particularly to Figure 3, it will be noted that the swinging gear bracket 70 is journaled concentric with shaft 72 so that the bracket may be oscillated with respect thereto upon actuation of the link 68 by eccentric 63. It will be apparent that if pulleys 82 and 84 are actuable by the drive in a clockwise direction, any swinging movement of the gear bracket 70 toward the right, as viewed in Figures 5 and 6, will cause an accelerated rotative movement as respects the rate of movement which would be effected from the drive 56 were the bracket and associate parts held in a fixed or non-moving position.

Similarly, any oscillation of the bracket in a clockwise direction, as viewed in these figures, will result in a deceleration of this gear train determined rate of rotation. In other words, the train from pulley 56 and worm 85 to pulley 82 tends to produce a selected rate of rotation of pulley 82 dependent on the gear ratio as built into the machine and as varied through the change gears or other speed varying mechanism.

At the same time, the oscillation of the bracket through operation of the eccentric superimposes on this movement of rotation a rotary oscillatory effect in that it is alternatively additive to and subtractive as respects the primarily determined rate of rotation. The amplitude of these variations, it will be understood, may be varied by suitable adjustment of the crank pin block 65 which may be placed concentric with discs 63 when there will be no oscillation, or moved outward variable amounts within the limits of the extent of the guide for the block. Additionally, the phase relationship of oscillatory movement to rotative movement—or rate of oscillation—may be varied by suitable speed change mechanism such as the pick-off or change gears 61—62 shown in Figures 3 and 4.

The resultant effect of these motions will perhaps be best understood by reference to Figure 25 in which there has been diagrammatically illustrated the essential elements for production of the particular movement in question, including the eccentric 63d connected by link 68d with the bracket or swinging member 70d having the driving element such as 76d meshing with the driven element such as 77d.

For facility of understanding, it will be noted that the mechanical features diagrammatically shown have been indicated by the same reference characters as those used to designate actual mechanical elements of the machine, but with the exponent d, indicating their diagrammatic significance.

Considering now the right hand portion of the diagram, there has been there charted individually the respective movements of the periphery of the member 77d as respects a fixed point under influence of rotation only—under influence of oscillation only and the combined effect of superimposing the rotary oscillation upon the plain rotary movement. In the chart portion the x co-ordinate has been divided in time units and the y co-ordinate in degrees of angular shifting. It will be noted that the movement effectable by the member 63d and link 68d is a simple harmonic motion, represented by a sinusoidal curve, which as shown in the lower part of the chart has an amplitude of 75° or a positive and negative 37½° movement and in the particular speed ratio of movements illustrated occupies 4 units of time.

The direct rotational effect during the same 4 units of time, as indicated in the upper portion of the chart, is an angular advance of 30° of the member 77d. Superimposing the sinusoidal curve of rotary oscillation on the straight line rotation advance, we find the result indicated at the upper portion of the chart in that during the time interval of four units the selected point on the circumference of 77d in two time units has positively advanced 90° due to the additive effect of the rotative and superimposed rotary oscillatory movements.

During the succeeding two time intervals the negative effect of the superimposed rotary oscillatory movement has exceeded the rotary advancing effect with the result that the selected point has receded from a 90° advance to a total of but 30° advance for a cycle of rotation of the eccentric 63d. It will, of course, be understood that this is a continuously repetitive effect, producing an ultimate progressive relative movement of periphery of 77d and a selected stationary point, but by a series of successive advancing or positive and retrograde or negative movements in place of either a slow continuous rotary advancing movement or a purely intermittent unidirectional movement.

As a result of this novel combination of movements, it will be noted that while the actual work advance during a cycle has been restricted to but 30° of angular movement that the relative movement between a selected stationary point and a selected point on the periphery of the member 77d has mounted to 150° of angular movement, whereby five times as great an abrading action will be exerted on a work piece driven in accordance with the foregoing as would be effected were the work piece given merely a continuous rotary movement with a corresponding amount of angular advance per unit of time.

It is, of course, to be understood that the particular relationship of movements indicated in the diagrammatic view and above described have been selected for purposes of illustration only of one relationship which has proved itself satisfactory in actual use. It will, however, be understood that the actual figures given will be varied in accordance with changes in the relative rates of rotation of the driver 76d and eccentric 63d effectable by the mechanisms which have been previously described.

The method of practical utilization of the foregoing principles in performance of work surfacing operations has been illustrated in the drawings.

As pointed out, the motion in question is imparted to the headstock spindle 32 and thus to the work piece 34. This work piece may be of either plain or cylindrical form, as indicated in Figure 2 for example, or of either shouldered or multi-diameter character as indicated in Figure 29.

The work piece, as before mentioned, is preferably rotatably supported by the tailstock center 35 and suitably driven with a motion as thus described through engagement of the headstock chuck 33 therewith. During such movement one or more abradant members 92 is suitably maintained in engagement with the surface of the article. These members, as shown in Figure 16, may comprise suitable sticks of abrasive having a curved face 93 to conform to the periphery of the article and are carried in a suitable holder 94 slidably retained in a head 95 within which they are actuated in the direction of the work as by spring 96. The head 95 is provided with ways 97 mounted for free movement as by anti-friction bearings 98 in the member 99.

The head is further formed with an elongated slot or socket 100 to receive the anti-frictionally mounted roller 101 carried by eccentric pin 102 on shaft 103 journaled within sleeve 104 which supports the driving motor 105 which may be of electrical, hydraulic, or other type as desired. It is to be understood that rotation of the motor will impart a high speed reciprocation or vibratory movement to the tool head, and thus the abrading element 92 in a direction axially of the work piece.

The several sleeves 104, as illustrated, are adjustably mounted in holders 106 at the outer ends of arms 107 having sleeve portions 108 slidably and rotatably mounted upon the reciprocating cylinder 109. This cylinder is mounted for reciprocation relative to the column on the barrel piston 110 having the rod portions 111 and 112 projecting from opposite ends of the cylinder and suitably secured respectively to the base portion of the column 30 and the bracket 37 of member 31. The arms 107 are preferably mounted for suitable resilient actuation in a direction to move the abradant members 92 toward the work piece as by springs 113, while their inward movement may be limited as by engagement of the adjustable abutments 114 with the cams 115 on the cam shaft 116 suitably supported from the cylinder 109.

One manner of supporting this shaft is illustrated in Figures 14 and 15 and comprises a clamp collar 117 encircling the cylinder having a bracket portion 118 rotatably engaging the lower end of the shaft, while a similar bracket 119 rotatably supports the upper end thereof.

One of said brackets—as illustrated, the member 117—has formed thereon a hydraulic cylinder 120 containing piston plunger 121 for shifting link 122, rocking crank arm 124 splined as at 125 to the shaft. A spring 126 tends to cause reverse movement of the crank arm and shaft.

By reference particularly to Figures 12 and 13 it will be noted that when in retracted position, the abutments 114 contact the low points on the cam, permitting the arms 107 to move toward the work. When it is desired to release the work, however, by actuation of the hydraulic circuit as hereinafter described in connection with Figure 24, arm 124 is oscillated into the position indicated by dotted lines in Figure 15, at which time the high points of the cam will contact the abutments 114, automatically shifting the abrading members outward with respect to and releasing their engagement with the work piece 34.

By reference to the drawings it will be noted that the mechanism just described is capable of controlling a multiplicity of work abrading members, may be placed in either opposed or staggered relation and may be longitudinally adjusted as desired along the reciprocating supporting cylinder 109 and in such multiple numbers as may be found practicable according to the area and extent of surface to be operated upon. In this connection, it will, of course, be understood that to take care of varying requirements different control cam shafts 116 having variable arrangements of cam 115 or even having a continuous cam shape may be employed.

Attention is invited to the fact that the structural elements just described have the capacity of superimposing two additional movements upon those already described in connection with rotation as respects relative shifting of the surface of the work piece and a selected minute abrasive grain on the member 92. The additive relative scrubbing or abrading action effectable by the vibration or rapid reciprocation of the abrasive element 92 has been diagrammatically illustrated in Figure 26. In the upper left hand portion of this figure we have the reproduction of the time-space curve as developed in Figure 25, while extending downwardly at the right is a diagrammatic representation of the additional simple harmonic sinusoidal curve for corresponding time elements resulting from the high speed oscillations.

The combined effect with an oscillatory speed in phased relation as to rate of the superimposed rotary, oscillatory movement is indicated by the spiral 127 having a lateral or axial amplitude corresponding to the stroke of the eccentric 102, and an angular progressive advance in successive cycles corresponding to the angular rotary axial advance per time cycle of a point on the periphery of the work or element 77d.

In Figure 27 there has been shown in greatly magnified or exaggerated form for purposes of illustration an element 128 representative of a single grain of the abrasive material, making up the element 92. The series of arrows shown in connection with this element point to the effective cutting edge of the abrasive particle at any point during the cycle of relative movement between work and abrasive particle as produced by the three movements illustrated diagrammatically combined in Figure 26—the irregular shape of abrasive particle having been shown clearly to bring out the fact that there is no turning movement of the particle itself, but merely a series of, which may be termed, successive lateral slidings in varying directions so that the movement at opposite halves of the cycle at any point are in rectilinearly opposed directions, automatically clearing the particle by dragging it away from any minute portions of the material of the article to be surfaced which has been previously cut away thereby.

Consequently, as previously pointed out, each individual abrasive particle performs with its varying lateral edge portions successive minute cuts, cleanly removing particles from the article to be surfaced, the cut in a given direction being of so short a duration as to avoid balling up of the removed material or creation of a "built-up" edge, tending to rupture or tear off portions producing deleterious scratches or roughness on the surface of the article.

As the additional axial relative movement between work and abradant element effected by longitudinal shifting of the cylinder 109, shown in the structural views as supporting the work abrading elements, is a gradual spiral progression or advance, it is believed the additive effect of this motion can adequately be understood by reference to Figure 28, diagrammatically illustrating the complete path effect as a fine helix winding in a continuous helical path circumferentially of the work piece—the width of the path itself being appreciably less than the width of an individual abrasive member 92 so that there is at all times during high speed oscillation of said member, an overlapping effect wiping out any possibility of reproduction of an actual banded path circumferentially of the work piece during finishing thereof.

The hydraulic system for controlling actuation of the machine utilized in carrying out the present invention of metal finishing is particularly illustrated in connection with Figure 24. As there shown, it comprises a pump or like source of hydraulic pressure medium 130 taking oil from reservoir 131 and discharging it respectively into line 132 for determining actuation of the reciprocating cylinder and line 133 extending to the control mechanisms for the work holding and abrading members. Line or conduit 132 extends to valve casing 134 having slidably mounted therein reversing valve 135 having a central spool 136 and the pair of grooves 137 and 138. This valve is reciprocable as by engagement therewith of adjustable collars 139 and 140 carried by rod 141 slidable within the valve and actuable by an arm 142 carried by and movable with the tool carrying cylinder 109.

By means of adjustment of collars 139 and 140 the length of stroke of the cylinder and its point of reversal may be readily determined.

A pair of exhaust conduits 143 and 144 are coupled with the valve casing for return of fluid to reservoir 131. Sealed within the casing is a second reversing valve 145—valve 135 serving as a pilot for determination of the position of this second reversing valve. This second reversing valve which has the piston portions 146 and 147, the intermediate spool 148 and the fluid control grooves 149 and 150.

Interconnecting the cylinder portions receiving the piston elements 146 and 147 with the central fluid receiving space 151 are the conduits 152 and 153, while centrally extending from space 151 is the conduit 154 designed to transmit the cylinder actuating fluid from line 132 selectively to either conduit 155 connected to the upper end of the hollow piston rod 111 or to conduit 156 connected to the lower piston rod 112.

In operation, assuming that the cylinder 109 is moving in an upward direction, collar 140 will engage and raise valve 135 coupling pressure line 132 with conduit 153. The coupling of pressure with conduit 153 will cause the same to react on piston 147, raising the valve member 145 so that its central spool will be disposed above conduit 154 and the flow will be through line 156 to the lower end of cylinder 109, forcing cylinder 109 downwardly. During this movement entrapped fluid in the upper end of the cylinder will be exhausted through conduit 155, groove 150, conduit 157, the rate control valve 158 and conduit 159 to reservoir.

As the cylinder descends it carries with it collar 139 until the latter reversely shifts valve 135 when valve 145 will be in turn shifted, coupling the other end of the cylinder with pressure and the lower end to reservoir by way of valve 158.

It will, of course, be understood that movement of the cylinder may be checked at any point, either by stopping of the pump or by moving rate valve 158 to a stop position.

The second conduit 133 forms a part of the control system of the machine. It includes the relief valve 159' and the control valve 160. This latter is shown in Figure 24 as in running position, the spool 161 blocking flow through line 133 so that fluid flow is prevented and all actuating urge is directed into the cylinder. When it is desired to stop the machine for removal and replacement of a work piece treadle 162 is depressed, shutting off reservoir connection 163 and permitting fluid to flow into line 164. This line or conduit has a number of branches. The first of these, 165, extends to cylinder 120 for oscillation of the cam shaft 116, causing outward or separating movement of the abrasive elements as respects the work piece.

A second branch 166 introduces fluid against the piston 47 and through passage 167 controlled by check valve 168, directs fluid against the piston 47' of locking pin 48, retracting same with respect to the tailstock spindle, thus releasing the spindle with respect to the work.

An additional conduit 170 introduces pressure fluid into the cylinder 171, depressing spring pressed valve 172 and thus shutting off flow of the coolant or lubricating medium to the tool.

It is to be noted that the coolant, such as a suitable cutting oil, is supplied from reservoir 173 by pump 174, being normally conveyed by conduits such as 175 to the passages 176 formed in the individual abrasive elements so that the cutting oil will be forced directly against the work within the space engageable by the individual abrasive element. A check valve 177 permits of return flow of excess fluid to reservoir 173 or of all fluid when the valve 172 is closed by way of conduit 178.

In Figures 19, 20 and 21 there have been shown a modified form of structure for imparting the superimposed rotational and oscillatory rotational movements to the work in that the pulley 180 designed to be driven by motor 51 actuates the internal splined shaft 181 having slidable therein the spline portion 182 of worm shaft 183, bearing worm 184, driving the train of gears 185, 186, 187, 188 and 189 for driving the pulley 190 corresponding to pulley 82. Gear 186 is provided with an eccentric pin 191 for link 192 for oscillation of the yoke link 193, rotatably but nontranslatably, engaging at 194 the free end of shaft 183. This link is fulcrumed as on the nut 196 adjustable to vary the throw of shaft 183 as by screw 197 actuable as by the knurled member 198.

With this form of the invention it will be appreciated that the reciprocation thus imparted to worm 194 will effect the desired acceleration and deceleration as respects the rate of rotation which would otherwise be imparted to pulley 190 by actuation of pulley 180.

Figures 22 and 23 illustrate a further alternative means of effecting the result in question in that power applied to pulley 199 directly actuates, through worm 200, the worm gear 201 having eccentric pin 202 for the link or pitman 203.

As the pin 202 moves in a counterclockwise direction with respect to the position occupied by the parts in Figure 22, the overrunning clutch elements 204 will grip clutch element 205 on shaft 206 and gear 207. This will cause counterclockwise rotation of gear 207 which will rotate gear 208 and shaft 209 in a clockwise direction, this motion being transmitted through gears 210 and 211 to the output pulley 212.

During the second half of the cycle of rotation of pin 202, gear 213 will be oscillated in the reverse direction, the overrunning clutch slipping so that no positive movement is imparted to gear 207. At this time, however, the gear will impart driving motion to the intermeshing gear 214 and the overriding clutch elements 215, which before moved freely, will now be effective as respects the clutch element 216 imparting motion to gear 211 and thus pulley 212 in a reverse direction at a higher rate due to the difference in ratios between the sets of intermeshing gears 207—208 and 213—214.

It is to be understood that the resultant movement attained by this mechanism is again that of a rotary oscillatory movement superimposed on a rotary movement—the particular shape of path thus produced being, of course, dependent upon the respective gear ratios employed.

It will, of course, be understood that the machine illustrated is a general purpose machine capable of utilization for finishing of either long or short work pieces of varying diameters and that the hydraulic conduits described in connection with Figure 24 are in the main of a flexible character permitting desired adjustments of the elements with which they are coupled. The capacity for vertical adjustment of the various tools on the cylinder 109, for example, has been particularly described in connection with Figure 14. To take care of varying lengths of work pieces it has been noted that the footstock assembly as an entirety is mounted for vertical adjustment.

To facilitate this general positioning, employment may be made, for example, of the adjusting screw 218 journaled in the column as at 219 and in threaded engagement with bracket 220 extending forwardly in lateral displaced relation to the cylinder for engagement with the unit 38. Suitable actuating means, such as the hand wheel 221 and beveled gearing 222, may be utilized to impart the necessary rotative movement to the screw.

It is additionally to be understood that in the performance of the process in question, specific description has been made of a machine for imparting the combined rotary and rotary oscillatory movements to the work piece itself. By mounting on the chuck 33, one or more abradant tool holders such as the unit 92—105, which is in itself completely self-contained, the combined effect of relative rotary—superimposed relative rotary, oscillatory and additional pulsating or vibrating movement in a plane or path transverse to the path of combined rotary and rotary oscillatory movements could be effected on either flat or cylindrical work dependent upon whether the abradant carrying members were placed in axial or radial position with respect to the chuck —all without any movement taking place in the work piece itself.

In this manner, the invention can be satisfactorily performed on shapes or sizes of work pieces which do not readily lend themselves to rotation. In such instances, it is to be understood that the work may be suitably secured on the footstock unit and that its vertical adjustment, for example, might be effected from the footstock or alternatively by suitably clamping same to the reciprocating cylinder, in which event the axial movement of the latter would again be utilized to impart the additional relative traverse movement to the parts.

It is further to be understood that the present process is particularly adapted for final finishing of the work piece surface, in which event the individual abrasive particles constituting the member 92 are extremely fine in size so that a vast number are simultaneously operating upon the work piece, each operating in individual such as illustrated in Figures 27 and 28, for example, but in overlying or overlapping relation so that the entire general area covered by the member 92 is being subjected to innumerable successive sharp cutting actions.

In view of the nature of the surface of the abrading member and the substantially true geometrical plane produced as a result thereof on the work piece, the feature of central introduction under pressure of the cutting fluid is particularly advantageous as insuring the presence of the fluid which due to the close fit of the parts might never otherwise become introduced therebetween.

Incidentally, when a cutting oil, for example, is employed for this purpose as the irregularities of the work piece surface are cut off, the presence of the pressure film thus created tends to build up a continuous oil film between the fine abrasive surface and the member to a degree that when the irregularities on the work surface are no longer of a nature to rupture the potential oil film, the film will cause discontinuance of abrasion as respects the highly accurate surface thus produced, irrespective of the period of continuance of operation of the machine in performance of the present method of finishing.

What is claimed is:

1. In a device of the character described, an abrading unit for utilization in producing a highly finished surface on a work piece comprising a rigid abrasive member, a mount therefor including a guiding head, means for resiliently urging the abrading member outwardly with respect to the head, a supporting shank having transverse guide ways, the head having portions cooperating with said guide ways, and means journaled in the shank and projecting into engagement with the head for effecting oscillation of the head with respect to the shank substantially as and for the purpose described.

2. In a device of the character described, an abrading unit for utilization in producing a highly finished surface on a work piece comprising a rigid abrasive member, a mount therefor including a guiding head, means for resiliently urging the abrading member outwardly with respect to the head, a supporting shank having transverse guide ways, the head having portions cooperating with said guide ways, means journaled in the shank and projecting into engagement with the head for effecting oscillation of the head with respect to the shank substantially as and for the purpose described, said abrading member having a cutting fluid passage formed therein having a discharge portion disposed centrally of the abrading face thereof, and means for introducing cutting fluid under pressure to the surface operated on by the abrading member by way of said passage.

3. A machine for production of a highly accurate surface on a work piece, comprising means for effecting oscillation of the work in a forward and reverse direction about its axis, a tool, means for supporting the tool in opposition to the work piece, means for effecting transverse vibration of the tool at a rate in excess of the rate of oscillation of the work, and means for imparting a rotary advance to the work to vary the zone of engagement between the tool and oscillating work.

4. A machine for production of a highly accurate surface on a work piece, comprising means for effecting oscillation of the work in a forward and reverse direction about its axis, a tool, means for supporting the tool in opposition to the work piece, means for effecting transverse vibration of the tool at a rate in excess of the rate of oscillation of the work, means for imparting a rotary advance to the work to vary the zone of engagement between the tool and oscillating work, and additional means to change the relative speeds of oscillation and advance of the work.

5. A machine for production of a highly accurate surface on a work piece, comprising means for effecting oscillation of the work in a forward and reverse direction about its axis, a tool, means for supporting the tool in opposition to the work piece, means for effecting transverse vibration of the tool at a rate in excess of the rate of oscillation of the work, means for imparting a rotary advance to the work to vary the zone of engagement between the tool and oscillating work, and means for simultaneously effecting a relative feeding movement of the work and tool in a direction parallel with the axis of rotation of the work.

6. A superfinishing machine of the character described including a bed, a work supporting member mounted thereon, means for supporting an abrading element positioned for engagement with work carried by the work support, means for effecting oscillation of the work support in a direction to oscillate a work piece carried thereby about the axis thereof, means for effecting rapid vibration of the tool in a direction axially of the work piece, and additional means for effecting combined relative adjustments of the work and tool in rotary and axial directions whereby to helically advance the zone of operation of the tool on the work resultant from the respective oscillatory and vibratory movements.

7. A machine of the character described, including a bed unit, a head stock carried thereby for engaging and determining the axial position of a work piece in the machine, a tool holder support carried by the bed and reciprocable relative thereto, tool supporting arms oscillatably mounted on the support and shiftable therewith and relative thereto, abrading elements carried by said arms, means carried by the arms for effecting vibratory movement of the tools with respect thereto, and means carried by the bed and reacting on the arms for determining the movement of the arms on their support in a direction toward and from the work piece.

8. A machine of the character described, including a bed unit, a headstock carried thereby for engaging and determining the axial position of a work piece in the machine, a tool holder support carried by the bed and reciprocable relative thereto, tool supporting arms oscillatably mounted on the support and shiftable therewith and relative thereto, abrading elements carried by said arms, means carried by the arms for effecting vibratory movement of the tools with respect thereto, and means carried by the bed and reacting on the arms for determining the movement of the arms on their support in a direction toward and from the work piece, said means including cam elements for reaction on the arms.

9. A machine of the character described, including a bed unit, a headstock carried thereby for engaging and determining the axial position of a work piece in the machine, a tool holder support carried by the bed and reciprocable relative thereto, tool supporting arms oscillatably mounted on the support and shiftable therewith and relative thereto, abrading elements carried by said arms, means carried by the arms for effecting vibratory movement of the tools with respect thereto, means carried by the bed and reacting on the arms for determining the movement of the arms on their support in a direction toward and from the work piece, said means including cam elements for reaction on the arms, a hydraulic actuating circuit, means coupling said circuit with the tool support for determining the movement thereof, and additional means coupling the circuit with the actuating cam for determining the oscillatory position of the tool holding arms with respect to the support.

10. A machine of the character described, including a bed unit, a headstock carried thereby for engaging and determining the axial position of a work piece in the machine, a work holder support carried by the bed and reciprocable relative thereto, tool supporting arms oscillatably mounted on the support and shiftable therewith and relative thereto, abrading elements carried by said arms, means carried by the arms for effecting vibratory movement of the tools with respect thereto, means carried by the bed and reacting on the arms for determining the movement of the arms on their support in a direction toward and from the work piece, said means including cam elements for reaction on the arms, a hydraulic actuating circuit, means coupling said circuit with the tool support for determining the movement thereof, additional means coupling the circuit with the actuating cam for determining the oscillatory position of the tool holding arms with respect to the support, and a single control means for determining the operative effect of the hydraulic circuit as respects said parts.

11. In a machine of the character described, the combination with a support for a rotary work piece, of motive means, a first drive train connecting the motive means with the work support for effecting a definite rate of rotation thereof, and an independent drive train reacting on the first drive train to effect alternate accelerating and decelerating reactions of the first drive train on the work support.

12. A machine for producing an accurately finished surface on a work piece including associate work holding and tool holding members, a first drive train for imparting rotation to one of said members at a predetermined initial rate of rotation, and additional means reacting on the member alternately in opposite directions as respects the unidirectional reaction of the first drive train whereby a pulsating rotation of the member is effected at a rotational rate determined by the first drive train.

13. A machine for producing an accurately finished surface on a work piece including associate work holding and tool holding members, a first drive train for imparting rotation to one of said members at a predetermined initial rate of rotation, additional means reacting on the member alternately in opposite directions as respects the unidirectional reaction of the first drive train whereby a pulsating rotation of the member is effected at a rotational rate determined by the first drive train, and means for simultaneously imparting a vibratory reciprocating movement to the other of said members in a direction transversely of the direction of rotary movement of the first member.

14. A machine for producing an accurately finished surface on a work piece including associate work holding and tool holding members, a first drive train for imparting rotation to one of said members at a predetermined initial rate of rotation, additional means reacting on the member alternately in opposite directions as respects the unidirectional reaction of the first drive train whereby a pulsating rotation of the member is effected at a rotational rate determined by the first drive train, means for simultaneously imparting a vibratory reciprocating movement to the other of said members in a direction transversely of the direction of rotary movement of the first member, and means for varying the rate and extent of reaction of said trains as respects the support.

GEORGE W. BINNS.
ALBERT H. DALL.